United States Patent
Henderson

(10) Patent No.: US 11,698,465 B2
(45) Date of Patent: Jul. 11, 2023

(54) DIRECTION FINDER

(71) Applicant: Atlantic Inertial Systems Limited, Plymouth (GB)

(72) Inventor: Geoffrey Henderson, Yelverton (GB)

(73) Assignee: ATLANTIC INERTIAL SYSTEMS LIMITED, Plymouth (GB)

(*) Notice: Subject to any disclaimer, the term of this patent is extended or adjusted under 35 U.S.C. 154(b) by 507 days.

(21) Appl. No.: 16/717,352

(22) Filed: Dec. 17, 2019

(65) Prior Publication Data
US 2021/0011175 A1    Jan. 14, 2021

(30) Foreign Application Priority Data

Jun. 4, 2019  (GB) .................................... 1907968

(51) Int. Cl.
*G01S 19/47* (2010.01)

(52) U.S. Cl.
CPC .................................... *G01S 19/47* (2013.01)

(58) Field of Classification Search
CPC ...................................................... G01S 19/47
See application file for complete search history.

(56) References Cited

U.S. PATENT DOCUMENTS

| | | | |
|---|---|---|---|
| 4,346,466 A | 8/1982 | Kanchev | |
| 5,617,317 A | 4/1997 | Ignagni | |
| 5,777,578 A | 7/1998 | Chang et al. | |
| 8,275,544 B1 | 9/2012 | Wells et al. | |
| 8,346,466 B2 | 1/2013 | Chueh et al. | |
| 9,395,187 B2 * | 7/2016 | Sheard | G01S 19/35 |
| 2009/0295633 A1 | 12/2009 | Pinto et al. | |
| 2019/0064364 A1 * | 2/2019 | Boysel | G01S 17/933 |

FOREIGN PATENT DOCUMENTS

| | | |
|---|---|---|
| JP | 2011185899 A | 9/2011 |
| JP | 2013170903 A | 9/2013 |
| JP | 2015017984 A | 1/2015 |
| WO | 2011053161 A1 | 5/2011 |

OTHER PUBLICATIONS

Gade, Kenneth; "The seven Ways to Find Heading"; The Journal of Navigation; (2016), 69, pp. 955-970.
European Search Report for Application No. 19215152.0, dated Jul. 13, 2020, 5 pages.
Abstract for JP2015017984 (A), Published: Jan. 29, 2015, 1 page.
Abstract of JP2013170903 (A), Published: Sep. 2, 2013, 1 page.
Abstract: JP2011185899 (A), Published: Sep. 22, 2011, 1 page.
Japanese Office Action for JP Application No. 2019-224143, dated Apr. 4, 2023, pp. 1-4.

* cited by examiner

*Primary Examiner* — Jeff A Burke
*Assistant Examiner* — Christopher A Buksa
(74) *Attorney, Agent, or Firm* — Cantor Colburn LLP

(57) ABSTRACT

A method of determining a reference direction for an angular measurement device, comprising: providing a rigid structure having an antenna for a global navigation satellite system (GNSS) fixed at a first point thereof; fixing the angular measurement device to a second point on the rigid structure, separated from the first point by at least 0.5 meters; while rotating the rigid structure so as to cause rotational movement of the antenna around the sensitive axis, acquiring velocity measurement data from the GNSS and angular velocity measurement data from the angular measurement device; and using the velocity measurement data and the angular velocity measurement data to determine a reference direction for the angular measurement device.

17 Claims, 2 Drawing Sheets ized direction reference. Alternatively, using that
direction reference, one could derive which direction is
North, thus providing a more typically useful absolute
direction reference. A similar technique can be used based
on GNSS position information, by reading the GNSS position
of two points separated by a distance. The direction
from one point to the other can be calculated by taking the
difference between the two positions. However, such reference
finding processes are impractical, at least when good
accuracy is required. For example, to get a similar accuracy
to that of an expensive gyrocompass, e.g. 1 milliradian
accuracy, the two ground positions would need to be separated
by 1 km, even when using a high-grade GNSS with a
positional accuracy of 1 meter (less expensive GNSS systems
only have accuracy to around 10 meters).

DIRECTION FINDER

FOREIGN PRIORITY

This application claims priority to United Kingdom (GB) Patent Application No. 1907968.0 filed Jun. 4, 2019, the entire contents of which is incorporated herein by reference.

TECHNICAL FIELD

This disclosure relates to a method and apparatus for determining an orientation.

BACKGROUND

Orientation finding (normally referred to as "North finding", although other reference directions are equally viable) is critical for accurate navigation, e.g. for determining local orientation and/or determining a direction to a distant location or object. It can be used either in fixed static observation systems or in portable (e.g. hand-held devices). Advanced north finding modules use a gyroscopic compass instead of a magnetometer. This avoids errors due to variations in the Earth's magnetic field, or due to local magnetic devices whose effect on the magnetic field is unknown or difficult to compensate. In addition, magnetometer based systems provide direction relative to magnetic North which is constantly moving, thus introducing a further error and requiring a further correction. On the other hand, gyroscopic compasses determine true North, i.e. as defined by the Earth's axis of rotation.

North finding is particularly useful for setting a reference for an inertial measurement unit (IMU). When such a system is turned on, the linear accelerations and angular rotation rates (assuming a full 3-axis IMU with three accelerometers and three gyroscopes) are measured and integrated to provide changes in the position and attitude of the IMU since start up. However, to provide absolute positioning and orientation, the IMU needs a reference position and attitude to which those accumulated changes can be added. This disclosure relates to a process for finding such a reference direction, e.g. North (or more generally a three dimensional attitude direction reference).

A gyroscope measures angular velocity (i.e. rotation rate) relative to its inertial position. There are many types of gyroscopes that operate based on different principles. These include: Classic Mechanical gyroscopes (i.e. a spinning wheel mounted on a gimbal; Optical gyroscopes, including both fibre optic gyros (FOGs) and Ring Laser Gyro (RLGs) which operate based on the Sagnac effect; and Vibrating gyroscopes, including Hemispheric Resonating Gyros (HRGs) and Micromechanical Gyros (MEMS) which operate based on the Coriolis effect.

Global Navigation Satellite Systems (GNSS) are positioning systems that use signals transmitted by a constellation of satellites to determine the location of a receiving antenna, using known (and regularly updated) positional information for the satellites together with time signals encoded into the transmitted signals. Several such GNSS systems exist or are in progress, including the Global Positioning System, Galileo, GLONASS and BeiDou-2.

GNSS can provide very accurate velocity information (particularly if carrier phase velocity is used) which is in a North referenced frame of reference. This velocity information can be used to find a directional reference by moving in a straight line while reading the velocity information from the GNSS. The direction of that straight line motion would be known from the GNSS velocities and can be used directly as an absolute direction reference. Alternatively, using that direction reference, one could derive which direction is North, thus providing a more typically useful absolute direction reference. A similar technique can be used based on GNSS position information, by reading the GNSS position of two points separated by a distance. The direction from one point to the other can be calculated by taking the difference between the two positions. However, such reference finding processes are impractical, at least when good accuracy is required. For example, to get a similar accuracy to that of an expensive gyrocompass, e.g. 1 milliradian accuracy, the two ground positions would need to be separated by 1 km, even when using a high-grade GNSS with a positional accuracy of 1 meter (less expensive GNSS systems only have accuracy to around 10 meters).

SUMMARY

According to this disclosure, there is provided a method of determining a reference direction for an angular measurement device. The method includes: providing a rigid structure having an antenna for a global navigation satellite system fixed at a first point thereof; fixing the angular measurement device to a second point on the rigid structure, wherein the second point is separated from the first point by at least 0.5 meters and wherein a sensitive axis of the angular measurement device is not aligned with the direction between the first point and the second point; while rotating the rigid structure so as to cause rotational movement of the antenna around the sensitive axis of the angular measurement device, acquiring velocity measurement data from the global navigation satellite system and angular velocity measurement data from the angular measurement device; and using the velocity measurement data and the angular velocity measurement data to determine a reference direction for the angular measurement device.

According to another aspect of this disclosure there is provided a device for determining a reference direction for an angular measurement device that includes: a rigid structure having an antenna for a global navigation satellite system fixed at a first point thereof; a mount point for mounting an angular measurement device at a second point on the rigid structure such that a sensitive axis of the angular measurement device is not aligned with the direction between the first point and the second point, wherein the second point is separated from the first point by at least 0.5 meters; and a processing device. The processing device is arranged to: acquire velocity measurement data from the global navigation satellite system and angular velocity measurement data from the angular measurement device while the rigid structure is rotated so as to cause rotational movement of the antenna around the sensitive axis of the angular measurement device; and using the velocity measurement data and the angular velocity measurement data to determine a reference direction for the angular measurement device.

By rotating the antenna around the angular measurement device, the antenna moves relative to the frame of reference of the global navigation satellite system (GNSS) and thus has a velocity in that frame of reference. Furthermore the velocity measurement data acquired from the GNSS provides a measurement of the antenna's movement direction in the frame of reference of the GNSS system (usually an Earth Centred Earth Fixed frame of reference), thus providing a direction that can be associated with a current angular position of the angular measurement device. It is thus possible to provide a reference direction to which all further inertial measurements of the angular measurement device can be related, thereby providing an absolute orientation in that frame of reference. The reference direction is obtained by making use of the lever arm effect created by the separation of the antenna from the angular measurement device and the rotation of the antenna around the angular measurement device. The lever arm effect means that the antenna is moving in the North East Down frame of reference while the angular measurement device is rotating in it. Essentially the information from the GNSS (via the antenna) provides absolute directional information in the North East Down frame of reference, which can then be associated with the current angular information from the angular measurement device to determine the current absolute direction of the angular measurement device in the frame of reference of the antenna (the North East Down frame).

This process of calculating a reference direction makes use of the fact that the motion of the antenna is different from that of the angular measurement device. The difference between these motions is then used to calculate a reference direction. It should be noted that this is a very different concept from a "transfer alignment" process in which an antenna and angular measurement device are substantially co-located such that the motions are substantially the same (and any difference in motion can be treated as an error). Such transfer alignment processes essentially assume that the motion of the antenna matches the motion of the device and therefore the detected motion of the antenna can be used assumed to be the motion of the device and thus used to determine a reference direction for the device. By contrast, this disclosure uses a difference in motions of the antenna and the device to calculate a reference direction when the antenna and the device are not co-located, but rather are separated from one another such that a lever arm effect exists when the antenna rotates about the angular measurement device.

It will be appreciated that the velocity measurement data can be obtained in different ways. For example, velocity data can be obtained by taking sequential position measurements and then using the difference between these (and the time between measurements) to calculate a velocity. Alternatively, in more expensive GNSS systems, velocity measurements can be obtained directly from the satellite signals by measuring the Doppler shift of the carrier wave of the satellite signals. Doppler-based velocity measurements are capable of producing more accurate velocity measurements than the basic delta-position technique described above and can be accurate to within a few centimeters per second. More preferably still, velocity measurements can be obtained using carrier phase velocity measurement techniques which can provide even more accurate velocity measurements. Moreover, the accuracy of these velocity measurements is increasing all the time with computing power and it may even be possible to obtain accuracy better than one centimeter per second. Data may be acquired from the GNSS at a rate of greater than 1 Hz, preferably greater than 5 Hz, more preferably around 10 Hz.

The position and velocity measurements obtained from the GNSS calculations provide the position and velocity (i.e. orientation) of the antenna that received the signals. As the antenna and the angular measurement device are both mounted to the same rigid structure, their relative position and relative orientation is fixed and well known. Thus, knowing the position and orientation of the antenna means that one can derive the position and orientation of the angular measurement device by relatively simple mathematics, thus providing the desired reference direction.

Ensuring enough physical separation between the first point and second point on the rigid structure, ensures that the antenna will have a sufficiently fast velocity as it is rotated around the angular measurement device. Increasing the distance of separation increases the lever arm effect such that a given angular displacement of the angular measurement device will correspond to a larger velocity of the antenna. Having sufficient velocity ensures having a sufficient signal to noise ratio to reduce the velocity error so that the reference direction is sufficiently accurate.

One of the benefits of this method is that a highly accurate reference direction can be obtained using inexpensive equipment, namely an inexpensive GNSS detector (antenna and corresponding processor) rather than requiring expensive, high-grade GNSS equipment.

The velocity measurement(s) obtained from the GNSS are related to the angular rate of the angular measurement device by straightforward mathematics. Taking a simple case, where the angular measurement device remains perfectly stationary in the GNSS reference frame (e.g. where it can be firmly pivotally mounted to a stationary structure), the velocity of the antenna is related to the angular rate of the angular measurement device be the formula $v=r\omega$ (where v is the velocity of the antenna determined from the GNSS, r is the distance between the first point and the second point, i.e. the distance between the antenna and the angular measurement device, and $\omega$ is the angular rate of the angular measurement device (which may be directly output from the device, or may be derived from sequential angular measurements, depending on the type of device being used).

The distance between the antenna and the angular measurement device affects the velocity of the antenna. A larger distance (and thus a larger lever arm) leads to a larger velocity which will be more accurate and hence will lead to a more accurate reference direction. However, there is a trade off with the size and thus portability of the equipment and the rigidity of the rigid structure. A separation of at least 0.5 meters results in a very compact device, with potential to yield good accuracy of reference direction. However, if higher accuracy of reference direction is required then it may be necessary to operate the system over a significant period of time in order to obtain enough measurements to reduce the noise in the velocity measurements. Therefore in some preferred examples, the second point is separated from the first point by at least 1 meter, more preferably at least 1.5 meters. Indeed in some examples, the separation may be at least 2 meters.

However, the longer the rigid structure, the heavier it will be. As the distance increases, the amount of material required to keep the structure sufficiently rigid (and thus maintain sufficiently fixed relative positions of the first and second points) increases, making the equipment heavier and bulkier. Thus in some preferred examples, the separation is no more than 3 meters, preferably no more than 2.5 meters, and in some examples no more than 2 meters.

Any suitable shape and size of rigid structure may be used. For example the structure need not be straight, extending directly between the first point and the second point, but could be curved (for example), so long as it rigidly defines the relative position of the antenna and the angular measurement device. However, in the interests of low weight and simplicity of manufacture, it is preferred that the rigid structure is a rod, preferably a substantially straight rod. The rigid structure may be made from any suitably rigid material, for example, wood, metal or carbon fibre. Of course the thickness and other properties of the rigid structure may be selected based on the desired length in order to provide the required rigidity.

As discussed above, in an ideal scenario, the angular measurement device should be perfectly stationary, with the antenna rotating (e.g. orbiting) around it. This simplifies the calculations required to work out the reference direction for the angular measurement device from the velocity measurements of the antenna. To that end, it is preferred in some examples that the rigid structure comprises a pivot point and rotating the rigid structure comprises rotating the rigid structure about the pivot point. The pivot point may be a mount point designed to attach in rotatable fashion to a stationary structure. For example it may be designed for rotatable attachment to a tripod that can be set up in the field to provide a relatively stable mounting structure. Other suitable mount points for the pivot point could be provided on vehicles, buildings or other reference structures such as triangulation stations used in surveying (sometimes referred to as "trig points").

As discussed above, the pivot point may be located proximate to the angular measurement device. The angular measurement device may then only rotate on the pivot axis such that there is no orbital movement of the angular measurement device around the pivot point. However, some separation of the angular measurement device from the pivot is acceptable. Even if the angular measurement device orbits around the pivot point to a certain extent, if the pivot point is sufficiently rigidly mounted then the positional relationship between the angular measurement device and the antenna is still well defined and the separation (i.e. lever arm) between angular measurement device and pivot point can be taken into account in the calculation of reference direction.

The angular measurement device could be any type of device that is capable of measuring changes in direction. For example it could be a rotary encoder, e.g. of an optical or magnetic type where an angular pattern (e.g. of black and white stripes of known and regular spacing) is detected by a suitable sensor. However, in most cases, the techniques and apparatus of this disclosure will find application in navigational systems which typically involve gyroscopes for angular rate measurement. Therefore in preferred examples the angular measurement device is a gyroscope. It could by any kind of gyroscope, including for example a classical spinning gyroscope, a Fibre Optic Gyro (FOG) or a Ring Laser Gyro (RLG). However, in some preferred examples the angular measurement device is a MEMS gyroscope. MEMS (micro electromechanical systems) gyroscopes are relatively inexpensive and therefore when combined with the low cost of the reference direction finding system described here can provide an overall inexpensive, but accurate navigational system. It will be appreciated that any type of MEMS gyroscope could be used, e.g. a vibrating ring gyro, a tuning fork-type gyro, a hemispherical resonator gyro or indeed any other MEMS gyro.

While the techniques discussed above can be used on a single angular measurement device, e.g. a single rotary encoder or a single gyroscope, they can equally be applied to devices having more than one such angular measurement device. In some examples the angular measurement device may comprise at least two, preferably at least three angular measurement devices. In certain preferred examples, the plurality (two, three or more) angular measurement devices are gyroscopes. Preferably such gyroscopes are arranged for two or three dimensional directional measurement. Normally such devices are arranged substantially orthogonally to one another, although this is not strictly necessary. Where the angular measurement device comprises two or more angular measurement devices, the overall orientation of the rigid structure is known in more than one dimension (more specifically the direction from the first point to the second point on the rigid structure is known in more than one dimension), which means that the motion of the antenna does not have to be constrained to one dimension, but rather could be allowed to move more freely. It is still important that the relative positions of the first point and the second point are well defined, but the motion of the antenna can be more general. This may for example put less strict requirements on the mounting of the rigid structure via the pivot such that the antenna could be less firmly mounted, leading to lower weight and cost of the equipment. It may also allow for lower cost and easier use of the equipment. For example, for uniform planar rotation, it may be necessary to use a motor to rotate the antenna around the angular measurement device. However, if out-of-plane motion can be accommodated then the antenna could be rotated round the angular measurement device by for example a person walking the antenna (on the rigid structure) around the angular measurement device. Any out-of-plane oscillations introduced by the steps of the person would be detected as changes to the orientation of the rigid structure by the plurality of angular measurement devices and could thus be taken into account in the calculations of the reference direction. The same principles allow operation of the device in harsher conditions such as higher winds which may also introduce out-of-plane motion of the antenna while it rotates.

The angular measurement device may further comprise at least one linear accelerometer, preferably at least two or three linear accelerometers arranged for three dimensional position measurement. As discussed above, these are preferably orthogonal with respect to one another, but this is not strictly necessary. The presence of linear accelerometers allows not only rotational movement of the angular measurement device to be detected, but also its positional displacement. This again significantly reduces the constraints on how the equipment is mounted relative to the ground. In particular, any positional movement in the mounting of the rigid structure, e.g. at a pivot, changes the orientation of the rigid structure in a way that cannot be detected by the angular measurement device(s). Therefor for higher accuracy, a position-invariant mount point is ideally used. However such a mount point may not be practical in many applications, particularly in field use or for portable equipment that needs to be set up and used quickly. The provision of linear accelerometers allows positional movement of the angular measurement device(s) to be detected and thus compensated. Essentially the accelerometers (optionally together with gyroscopes) can be used to perform inertial navigation of the angular measurement device, thus keeping track of its positional changes as the pivot point moves. Thus the mounting of the rigid structure need not be as stable, merely providing a support structure for the rotational movement. For example mounting to a tripod which may bend or move (e.g. with the oscillations introduced by the rotational movement of the rigid structure and the antenna) becomes practical without reducing the accuracy of the reference direction finding, as the movements of the pivot point can be detected by the accelerometers and compensated in the calculations of the reference direction. This is a significant feature in terms of allowing a highly accurate reference direction to be obtained with inexpensive and light weight equipment that can be portable, quickly set up and quickly operated and thus is ideal for field use and in time-pressured scenarios. With good enough accelerometers, it may even be possible for the rigid structure to be held by a person with the angular measurement device held close to the body and the antenna on the end of the rigid structure extending away from the body. As the person rotates their body on the spot, they act as a pivot point with a lot of undesired positional and rotational movement of the angular measurement device. However, if the accelerometers and gyroscopes can detect and compensate for those undesired movements then the orientation of the rigid structure (in the GNSS frame of reference) can still be known accurately and thus the velocity (and hence direction) measurements obtained from the GNSS of the motion of the antenna can still be accurately translated back to an orientation of the angular measurement device.

Therefore in preferred examples acceleration data from the or each linear accelerometer and potentially the angular rotation data from the or each gyroscope is used to compensate for any positional movement of the angular measurement device while the angular measurement data and velocity measurement data is acquired. The acceleration data can be used to track the movement of the second end of the rigid structure and thus of the mount point and the angular measurement device.

As discussed above, the use of multiple gyroscopes and multiple accelerometers provides the best data on the motion of the angular measurement device and thus the motion of the second point on the rigid structure and the orientation of the rigid structure. In certain preferred examples therefore, the angular measurement device is an inertial measurement unit, preferably comprising three gyroscopes and three linear accelerometers. Such self-contained inertial measurement units are readily available and frequently used in many devices. The techniques provided here provide fast, efficient and accurate calibration of such devices which can be used for in the field calibration without requiring a rigidly fixed pivot.

The way in which the rigid structure is rotated, i.e. the way in which the antenna is rotated about the angular measurement device can take many forms. In some examples rotating the rigid structure comprises rotating the rigid structure continuously in a substantially circular motion. Such motion is simple and easy to perform in a single plane and can be repeated easily with very little energy. For example a simple motor can be arranged to rotate the rigid structure so as to accomplish such motion. The circular motion may be parallel to the ground, i.e. horizontal motion. However, the motion does not need to be circular and could instead be a more complex motion, including motion in more than one plane. Such motions may be useful in areas where space is constrained such that a full circle of rotation is not feasible or desirable. For example, part of a generally circular motion could be bent out of plane to negotiate an obstacle. In general, it should also be appreciated that the rotation does not have to take place in a particular plane (or indeed substantially in a particular plane). For example, almost any motion of the antenna relative to the angular measurement device will result in acquiring information that can be converted into a reference direction for the angular measurement device. In some preferred examples the motion is an arc of an inverted pendulum, i.e. an arc that is traversed above the pivot point. Thus the rigid structure may be rotated above the antenna as an inverted pendulum. This motion may be in a substantially vertical arc. Thus the antenna is moved back and forth in an arc over and around the angular measurement device. A non-inverted pendulum arrangement can also be used, although the inverted pendulum is preferred as it does not require any structure above the GNSS antenna which might block or hinder the GNSS signal.

In other examples, rotating the rigid structure may comprise oscillating the rigid structure so as to move the antenna back and forth along an arc. Such motion allows for operation in much more constrained spaces and may also be more straightforward to carry out while an operator stands close to the angular measurement device (while a full circular motion might require the operator to move or stand clear while the calibration movement was carried out). It will generally be preferred to use as large an arc as possible, e.g. in some examples an arc of at least 60 degrees, preferably at least 90 degrees, more preferably at least 120 degrees or at least 180 degrees. As discussed above, the motion does not need to be an exact arc, but could encompass out of plane (of the arc) motion. A series of arcs could also be used if desired. In addition, it will be appreciated that oscillatory arc motion and generally circular motion are not incompatible, but may both be moved, e.g. one after the other or interleaved if desired.

While a single rotation or arc motion may be sufficient in some cases to acquire enough information to perform the required calibration, i.e. to find a reference direction with sufficient accuracy, in preferred examples rotating the rigid structure comprises rotating the rigid structure repeatedly through the same motion so as to acquire repeated measurements for improving the accuracy of the determined reference direction. Many measurements can of course be taken throughout a single motion (e.g. many measurements may be taken through a single circular rotation or through a single arc motion). However, repeating measurement over the course of several such motions gathers more data and reduces the random errors in the measurements, thus leading to an improved overall accuracy in the reference direction. In some examples, GNSS velocity data is acquired at a rate of between 1 Hz and 10 Hz. Measurements may be taken over any suitable period which may be determined by the required accuracy. In some examples, measurements are acquired over a period of at least 10 seconds, preferably at least 30 seconds, preferably at least a minute, preferably at least 5 minutes. In some examples the period is no more than 20 minutes, more preferably no more than 10 minutes so as to allow calibration to be performed in a relatively short timescale that does not inconvenience the user too much.

In general, it is preferred to move the antenna as fast as possible within reason. Faster movement of the antenna results in a better signal to noise ratio in the velocity measurements from the GNSS as the error is of fixed magnitude, so increasing the magnitude of the measurement gives better accuracy. However, there are practical limits on how fast the antenna can be moved without causing a hazard and without incurring excessive energy costs (e.g. a powerful motor). Therefore in certain preferred examples the antenna is moved at a velocity of at least 0.1 meters per second, preferably at least 0.5 meters per second, preferably at least 1 meter per second. In some examples the velocity is preferably no more than 10 meters per second, preferably no more than 5 meters per second. The lower speed reduces the energy consumption (in the case of a motorised equipment) and reduces the risks associated with collision.

Where repeated measurements are taken, combining these together into an improved reference direction may be accomplished in a number of different ways. For example, the measurements may simply be averaged over time. However, preferably a more sophisticated approach is used. For example, various statistical techniques may be applied including Bayesian estimation, most probable estimate, least squares estimate, etc. In certain preferred examples the acquired data can all be fed into a suitable implication engine (a process that knows the dynamics of the system and can process the data and the implications of that data using the known dynamics of the system to output an estimate of the state of the system). One particularly preferred implication engine is a Kalman filter. The Kalman filter can be programmed with the various relationships between the measurements, including for example the separation between the first and second points, the orientation of the antenna and the angular measurement device relative to the rigid structure, etc. as required. The raw GNSS data and the raw angular velocity measurements from the angular measurement device(s) can then be fed into the Kalman filter which can use the current estimated state in combination with the new data to output a new, improved estimate of the state (including the reference direction) and improved estimates of the errors in each state variable. The Kalman filter can also monitor and estimate known error variables relating to the GNSS system and the angular measurement device(s) and any linear accelerometers being used. For example gyroscopes and accelerometers suffer from bias and scale factor errors which can be monitored and estimated and corrected by the Kalman filter (or other calculation processes) so as to minimise the effect of these on the calculation of the reference direction and thus improve the overall accuracy.

BRIEF DESCRIPTION OF DRAWINGS

One or more non-limiting examples will now be described, by way of example only, and with reference to the accompanying figures in which.

DETAILED DESCRIPTION

Figure 1:
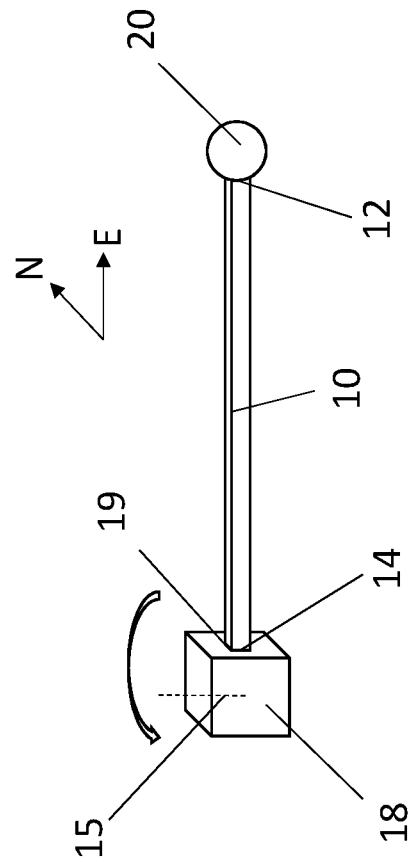
FIG. 1 shows a rod and antenna attached to a pivot and illustrates how velocity data and angular velocity data can be used to calculate a direction.

FIG. 1 illustrates a principle of this disclosure. A rigid structure in the form of a rod 10 has a Global Navigation Satellite System (GNSS) antenna 20 fixed at a first end 12 of the rod 10. The second end 14 of the rod 10 is attached to a pivot 16 at a pivot point 17 of the rod 10. The rod 10 is arranged for movement in the horizontal plane (i.e. parallel to the ground) so that it rotates around the pivot 16. More particularly, the antenna 20 sweeps out an arc (or a complete circle) around the pivot 16 as the rod 10 rotates around the pivot 16. An angular measurement device (not shown in FIG. 1) is provided at the second end 14 of the rod 10 (e.g. attached to a mount point on the rod) and can determine the rotation rate around its sensitive axis 15 (providing its sensitive axis 15 is not pointing directly along the rod 10). The antenna 20 receives a GNSS signal from which the velocity of the antenna can be derived in the North East Down frame of reference.

As the length of the rod 10 is known (specifically the distance between the antenna and the pivot), the circular (or arc) motion of the antenna can be related to the angular rate measured by the angular measurement device by the formula:

$$v = \omega \times r$$

where:

v is the velocity vector derived from the GNSS signal r is the separation vector between the antenna and the pivot ω is the angular velocity vector measured by the angular measurement device.

As the velocity, v from the GNSS receiver is a vector in the North East Down frame of reference, it can be separated into a North component and an East component. The ratio of these components is directly related to the current heading, θ of the rod 10. For example, if the rod 10 is pointing due North, the GNSS velocity, v will have a zero North component and a large (magnitude) East component. Similarly, if the rod is pointing due East, the GNSS velocity, v will have a large North component and a zero East component. Thus the heading angle, θ of the rod 10 (i.e. the current direction relative to true North) can be calculated as follows:

$$v_N = \omega_D r \sin \theta$$

$$v_E = \omega_D r \cos \theta$$

$$\theta = a \tan 2(v_E, -v_N)$$

Where $\omega_D$ is the positive rotation about the Down direction (in the North East Down frame of reference), representing an increase in Heading. The a tan 2 function is a four-quadrant arctangent function.

In a basic implementation, where the second end 14 of the rod 10 is fixed rigidly to a pivot 16 via pivot point 17, an observation of the GNSS velocity v, which gives a measurement of the antenna velocity, can be used to derive a heading of the rod 10 (i.e. its angle relative to North) and therefore the heading of any angular measurement device that is fixedly attached to the rod 10. In this way, an angular measurement device can be calibrated (by determining a reference direction for it) by attaching it to the rod 10 such that the orientation of the rod and the orientation of the angular measurement device are in a fixed and known relationship (i.e. so that the orientation of the sensitive axis 15 of the angular measurement device is known relative to the orientation of the rod 10).

This principle works because the antenna 20 is spatially separated from the angular measurement device so as to ensure that the rotation causes the antenna to move at sufficient velocity in the North East Down frame of reference, i.e. the antenna must move relative to the ground so that the GNSS signal provides a velocity in the North East Down frame of reference. In this example, the rod 10 is 2 meters long such that the antenna 20 is 2 meters from the pivot 16 and when rotated around the pivot, the rod 10 follows an arc of a circle of diameter 4 meters. The velocity of the antenna needs to be sufficiently high relative to the signal noise, and therefore a longer rod 10 allows a lower angular velocity for a given linear velocity. The rod 10 can thus be made shorter, but it will then be desirable to rotate it faster (higher angular rate).

The above example relies on knowing information about the pivot, namely that it is fixed and not moving. This is impractical for field use where such a rigid pivot may not be readily achievable, at least within a short time frame. This disclosure is particularly advantageous for use in calibrating IMUs in the field.

Figure 2:
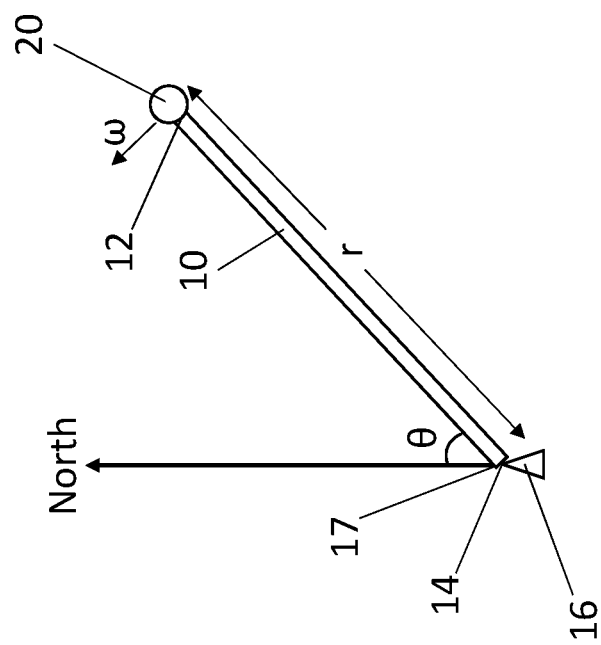
FIG. 2 shows a rod with an antenna at one end and an IMU at the other end.

FIG. 2 shows a rod 10 with a GNSS antenna 20 at a first end 12 similar to FIG. 1. However, at a second end 14, an inertial measurement unit (IMU) 18 is fixed to the rod 10 at a mount point 19. The second end 14 of the rod 10 is not fixed rigidly to a pivot, but rather is permitted to move slightly. The second end 14 (and thus the IMU 18) is still used as the centre of rotation of the apparatus so that the antenna 20 rotates around the IMU 18 and thus has a relatively high velocity in the North East Down frame of reference. With the second end 14 of the rod 10 not firmly fixed, the velocity data from the antenna 20 cannot be directly associated with the angular velocity detected by a gyro of the IMU 18 as some of that angular velocity may be due to movement of the second end 14 rather than due to the first end 12. However, as the IMU 18 (typically comprising three gyroscopes and three accelerometers for full three dimensional inertial navigation) can detect and quantify its own movements via its linear accelerometers, it can compensate for the fact that the second end 14 is not fixed firmly and can thus determine the relative changes in position of the second end 14, thus allowing the velocity data from the antenna 20 to be correctly associated with the gyroscopes' angular velocity data.

Figure 3:
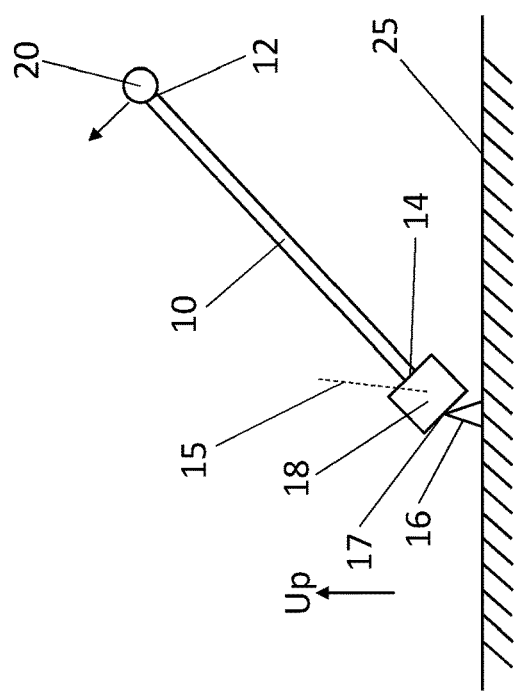
FIG. 3 shows the rod and antenna being used with movement in the vertical plane.

It will also be appreciated that the movement of the antenna 20 does not have to be constrained to rotation in the horizontal plane, but rather can include movement in other planes, e.g. the vertical plane. This is illustrated in FIG. 3 in which the rod 10 with antenna 20 and IMU 18 is mounted to a pivot 16 and is oscillated back and forth in an arc in the vertical plane over the ground 25. The pivot 16 need not be a rigid pivot but could be a temporary pivot such as a tripod or temporary fixing that keeps the second end 14 generally constrained so that the first end 12 and antenna 20 rotate around the second end 14, but it can allow for some movement, e.g. a few centimeters of movement can readily be tolerated and compensated by the accelerometer data of the IMU 18.

The processing that associates the velocity data from the antenna 20 with the angular velocity data from the IMU 18 (or other angular measurement device) can be done in many ways. For example, the GNSS provides position data in addition to the velocity data and can thus be used to determine the relative change in position of the antenna 20 (and first end 12). Meanwhile, the accelerometer data from the IMU 18 can be used to determine the relative change in position of the second end 14. Together, these can be used to calculate the direction of the rod 10 and thus a reference direction for the IMU 18 (which is fixed to the rod 10 in a known relative orientation) using geometrical calculations. However, for sufficient accuracy, a number of measurements will generally be required so that the accuracy can be reduced to an acceptable size. A convenient way of doing this is to sample all of the information available, namely the GNSS position and velocity information, the IMU gyroscope measurements and accelerometer measurements and use these all as observations input into a Kalman Filter (or similar iterative process). The Kalman Filter is programmed with the dynamics of the system, e.g. the relative positional arrangements of the antenna 20 and the IMU 18 (and all of its sensors). As each measurement is taken, the Kalman Filter uses its internal system model to estimate the current state of the system and also to estimate the errors in each state variable. The Kalman Filter then outputs a best estimate of the system state, which includes the required reference direction for calibrating the IMU 18. Every new measurement improves the Kalman Filter's estimate and thus improves the reference direction estimate.

Figure 4:
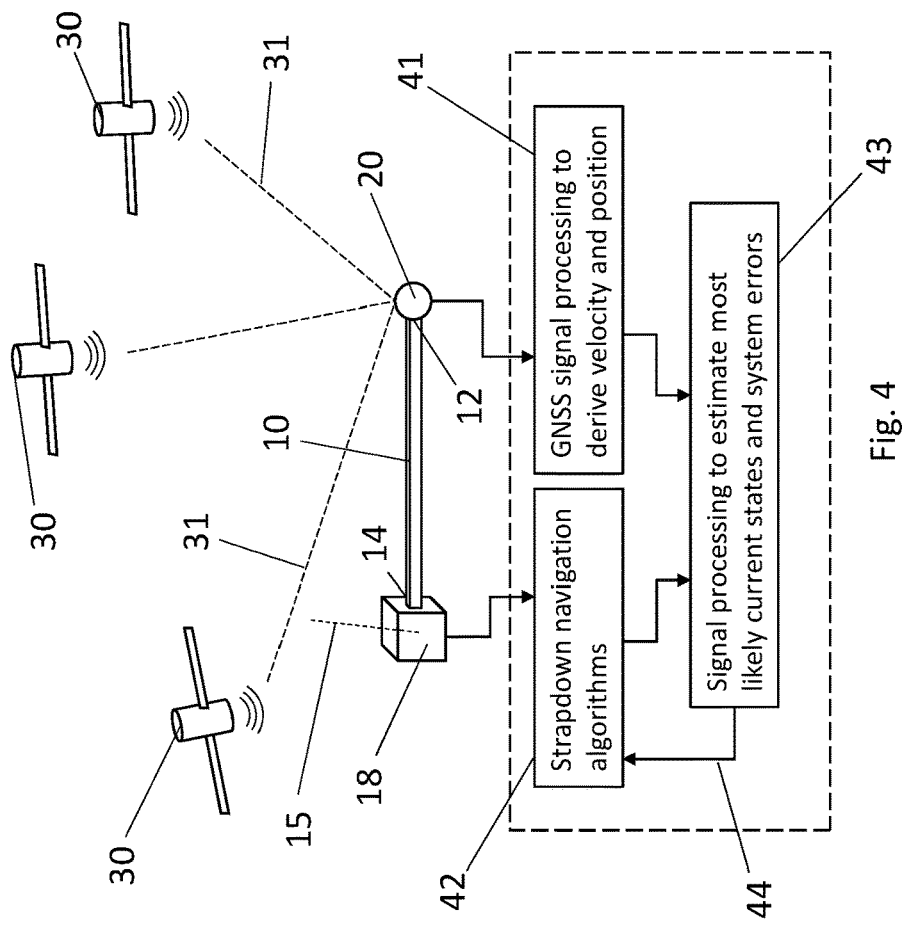
FIG. 4 illustrates the method of processing the data.

This process is illustrated in FIG. 4 which shows three GNSS satellites 30 whose signals 31 are received by antenna 20 attached at the first end 12 of rod 10. IMU 18 is mounted on mount point 19 at the second end 14 of rod 10 in the same way as in FIG. 2. The GNSS data from the antenna 20 is then processed at 41 to derive velocity and position information for the antenna 20. At the same time, the IMU data (gyroscope and linear accelerometer data) is processed at 42 via strapdown inertial navigation algorithms. These determine the relative changes in position and attitude (heading, elevation and bank) from an initial reference. The data from the GNSS processing 41 and the data from the inertial navigation processing 42 is fed into the Kalman Filter 43 which processes all data to estimate the current state and system errors. Part of the current state estimated by the Kalman Filter includes an estimate of the current position and attitude of the IMU 18. This can be fed back to the IMU 18 as indicated at 44 to calibrate the IMU 18.

The invention claimed is:

1. A method of determining a reference direction for an angular measurement device, comprising:
   providing a rigid structure having an antenna for a global navigation satellite system fixed at a first point thereof;
   fixing the angular measurement device to a second point on the rigid structure, wherein the second point is separated from the first point by at least 0.5 meters and wherein a sensitive axis of the angular measurement device is not aligned with the direction between the first point and the second point;
   while rotating the rigid structure so as to cause rotational movement of the antenna around the sensitive axis of the angular measurement device, acquiring velocity measurement data from the global navigation satellite system and angular velocity measurement data from the angular measurement device; and
   using the velocity measurement data and the angular velocity measurement data to determine a reference direction for the angular measurement device.

2. The method as claimed in claim 1, wherein the second point is separated from the first point by at least 1 meter.

3. The method as claimed in claim 1, wherein the second point is separated from the first point by at least 1.5 meters.

4. The method as claimed in claim 1, wherein the rigid structure is a rod, preferably a substantially straight rod.

5. The method as claimed in claim 4, wherein the pivot point is located proximate to the angular measurement device.

6. The method as claimed in claim 1, wherein the rigid structure comprises a pivot point and wherein rotating the rigid structure comprises rotating the rigid structure about the pivot point.

7. The method as claimed in claim 1, wherein the angular measurement device is a gyroscope.

8. The method as claimed in claim 7, wherein the gyroscope is a MEMS gyroscope.

9. The method as claimed in claim 8, wherein acceleration data from each linear accelerometer is used to compensate for any positional movement of the angular measurement device while the angular measurement data and velocity measurement data is acquired.

10. The method as claimed in claim 1, wherein the angular measurement device comprises at least two angular measurement devices.

11. The method as claimed in claim 1, wherein the angular measurement device further comprises at one or more accelerometers arranged for three dimensional position measurement.

12. The method as claimed in claim 1, wherein the angular measurement device is an inertial measurement unit, preferably comprising three gyroscopes and three linear accelerometers.

13. The method as claimed in claim 1, wherein rotating the rigid structure comprises rotating the rigid structure continuously in a substantially circular motion, optionally parallel to the ground.

14. The method as claimed in claim 1, wherein rotating the rigid structure comprises rotating the rigid structure above the antenna as an inverted pendulum, optionally in a substantially vertical arc.

15. The method as claimed in claim 1, wherein rotating the rigid structure comprises oscillating the rigid structure so as to move the antenna back and forth along an arc.

16. The method as claimed in claim 1, wherein rotating the rigid structure comprises rotating the rigid structure repeatedly through the same motion so as to acquire repeated measurements for improving the accuracy of the determined reference direction.

17. A device for determining a reference direction for an angular measurement device, comprising:

a rigid structure having an antenna for a global navigation satellite system fixed at a first point thereof;

a mount point for mounting an angular measurement device at a second point on the rigid structure such that a sensitive axis of the angular measurement device is not aligned with the direction between the first point and the second point, wherein the second point is separated from the first point by at least 0.5 meters; and a processing device arranged to:

acquire velocity measurement data from the global navigation satellite system and angular velocity measurement data from the angular measurement device while the rigid structure is rotated so as to cause rotational movement of the antenna around the sensitive axis of the angular measurement device; and using the velocity measurement data and the angular velocity measurement data to determine a reference direction for the angular measurement device.

* * * * *